Nov. 8, 1949 — P. S. MORGAN — 2,487,664
STEP ACTION BUOYANCY SCALE
Filed May 18, 1945 — 2 Sheets-Sheet 1

INVENTOR.
Porter S. Morgan,
BY
ATTORNEY

Nov. 8, 1949 P. S. MORGAN 2,487,664
STEP ACTION BUOYANCY SCALE
Filed May 18, 1945 2 Sheets-Sheet 2
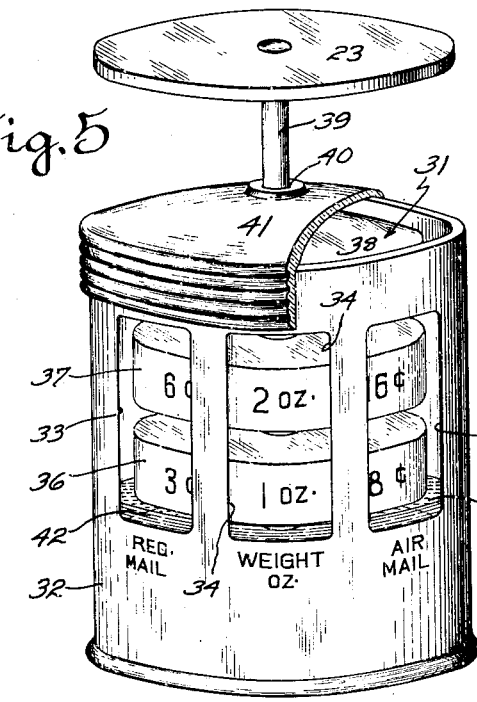
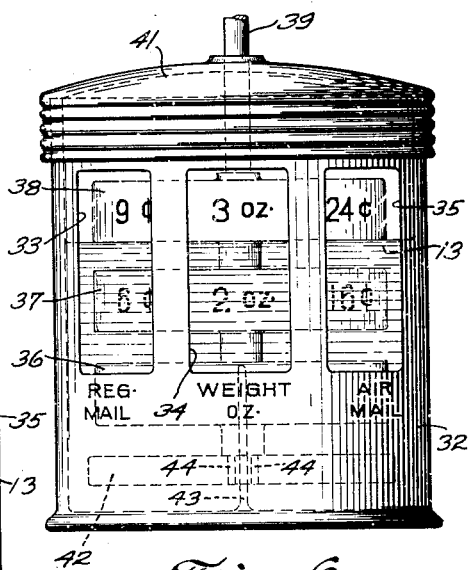
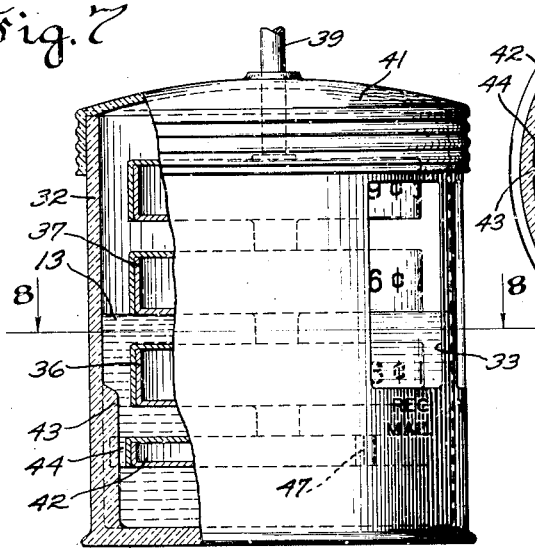
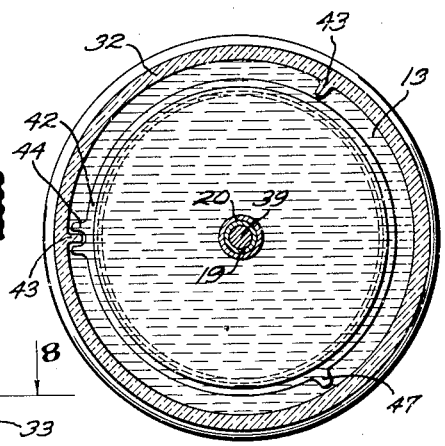
INVENTOR,
Porter S. Morgan,
BY
ATTORNEY Patented Nov. 8, 1949

2,487,664

UNITED STATES PATENT OFFICE 2,487,664

STEP ACTION BUOYANCY SCALE

Porter S. Morgan, Weston, Conn.

Application May 18, 1945, Serial No. 594,533

10 Claims. (Cl. 265—43)

This invention relates to light duty weighing scales particularly suited to serve as a postal scale.

The weighing of mailing pieces is one instance in the weight measuring art wherein variations in the exact magnitude of load weight within certain ranges of weight values are inconsequential and indeed useless either to indicate or to know. For example, in determining whether three-cent postage or six-cent postage is required on a given piece of first class or letter mail, it is desired merely to know whether the weight does or does not exceed one ounce. It is immaterial to know what fractional part of an ounce the mail may weigh. In such cases the presence on the weight indicating beam or chart of a weighing scale of indicia designating fractions of ounces is not only useless but an actual detriment to the easiest accurate reading of the desired information, namely whether the load weight does or does not exceed a certain whole number of ounces.

Consequently an object of this invention is to provide a step action automatic weighing scale which shall perform a different and more easily distinguished indicating function at predetermined critical points of weight value than in the intervening range of weight values.

A related object is to provide in a step action weighing scale "over-and-under" indicating means serving automatically to show at a glance, not merely whether the weight of a load is over or under a single predetermined critical magnitude, but to show successively and automatically whether the load weight is over or under any of two or more predetermined critical magnitudes separated by ranges of fractional magnitudes.

A further object is to embody the improvements in a scale of low cost construction comprising a device of outward form and appearance suitable and appealing for portable use on a desk in an office or in the home. My improved postal scale is designed for use to test the weight of outgoing mail in a manner to ascertain instantly by a casual glance without close scrutiny of any fine scale graduations, what postage is required by the mailing piece.

A still further object is to make such a scale even more convenient and handy of use by providing it with a variety of sets of separately observable indicia directly indicative of different money values of postage required by a mailing piece of given weight, depending say upon the differing rates of postage required for air mail, registered mail, etc.

Still other objects are to confine all functioning apparatus in such a scale to a single movable part.

These and other objectives of the invention will become clear as we proceed with a description of practical embodiments intended to illustrate the invention, which description refers to the appended drawings wherein:

Fig. 5 shows a modification of the scale of Fig. 1 with the mail receptacle unloaded.

Fig. 6 is a fragmentary view in elevation showing the float of Fig. 5 as positioned when the mail receptacle is loaded to an extent minutely exceeding two whole ounces.

Fig. 7 is a view looking at the left side of Fig. 6 with the front container wall partially broken away to expose a modified interior construction.

Fig. 8 is a plan view taken in section on the plane 8—8 in Fig. 7.

Figure 1:
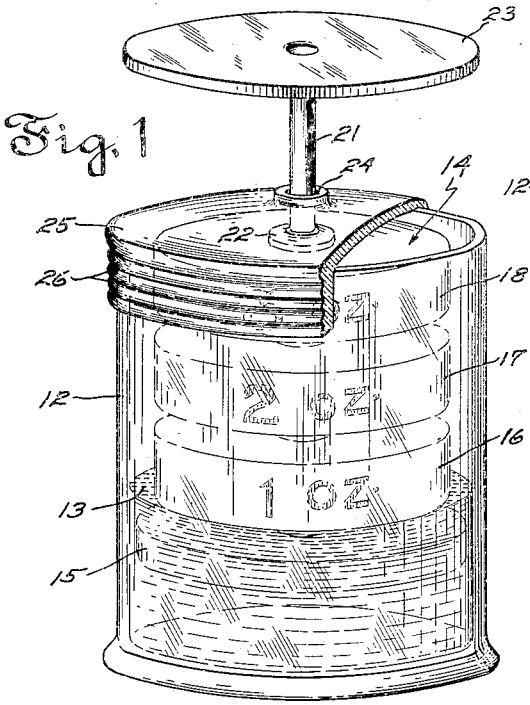
Fig. 1 is an outside perspective view of a postal scale incorporating the present invention with the cover cap of the liquid container partly broken away.

In the embodiment of my invention shown in Figs. 1 to 4, an ordinary cylindrical glass jar 12 with open top and having preferably transparent walls serves as container for a suitable quantity of liquid 13. The liquid may be opaque, colored or colorless and may have any desired degree of transparency. Buoyed by the body of liquid 13 a float structure indicated as a whole by 14 is composed of hollow empty built-up float sections of which the bottom float section is designated 15, and the next higher sections are designated 16, 17 and 18 in order. These float sections form a float structure having an externally stepped contour and comprised of a series of vertically alternating relatively small and relatively large shouldered body portions which displace differing volumes of liquid corresponding respectively to equal increments of increase of the draft of float 14 in the body of liquid.

Each float section may be comprised of telescopically and fixedly assembled cups made of any suitable light, thin and non-warpable material such as rust proof sheet metal or a good grade of permanently shaped molded plastic. A liquid tight seal is provided at all joints between these section forming cups and the adjacent float sections have short projecting necks 19 and 20 which are telescopically and fixedly assembled and which also are sealed liquid tight at all joints therebetween. Any liquid pervious cement will satisfactorily seal all joints in a manner to bond the assembled float sections 15 to 18, inclusive, into a unitary float structure.

Extending centrally through all float section necks 19 there is a stiff vertical stem 21 having a flange 22 by which it is assembled in fluid tight relation to the top wall of float section 18 so that stem 21 is firmly fixed to the float structure 14. At its top end, stem 21 fixedly carries a receiver 23 for a weighable load such as a piece of mailing matter. Stem 21 extends through and has a free sliding fit in a bearing hole 24 in the cover cap 25 which fits over the top of container 12 and which may or need not be fastened on the latter. If fastened, the cover cap will preferably be removable as by screw threaded engagement thereof with the container top. To facilitate finger grasp, corrugations such as 26 may be formed on the periphery of cap 25. On the outer peripheral edge of each of the float sections, 16, 17 and 18, certain indicia one above another are marked so as to be visible through the side wall of container 12. These indicia represent increments or ranges of increase in the weight value of loads placed on receiver 23 to be tested for weight.

Figs. 5 to 8 show modifications or refinements in the weighing scale of Figs. 1 to 4, wherein the transparent container 32 may be made of glass or a transparent plastic and chemically frosted or sandblasted on its outer surface to make its walls for the most part translucent or even opaque except for circumferentially separated vertically elongated rectangular areas such as 33, 34, 35. These areas may be left transparent to afford windows each of which will expose to view from the exterior of the container a different vertical series of weight value designating indicia carried by the float sections, 36, 37 and 38. To indicate the category of the weight value marks appearing in each of said windows the container may carry beneath each window some appropriate legend informative of such category. The examples of such legends illustrated read "Reg. Mail," "Weight Oz.," "Air Mail." Since it here becomes of importance to keep the float carried indicia in register with the proper window, means are provided to prevent turning of the float about its vertical axis relative to the container. While such means might consist in making stem 39 square with a free sliding fit in a square bearing hole 40 in cover cap 41, or might consist in corresponding oval or flat sided shapes of the float section 42 and container 32 in plan view instead of the round shapes shown in the drawings, I have chosen to illustrate in Figs. 7 and 8 the turn stop expedient of a vertical guide rib 43 formed on the inside of the container wall slidably engaged by a forked lug 44 laterally carried by float section 42.

The mode of operation of my improved postal scale will mainly be obvious from the various figures of the drawings. Starting with the position of parts shown in Figs. 1 and 2, the balance existing between the weight of float structure 14 with its stem supported load receptacle 23 and the buoyancy of the lowest float section 15 is such that the water level reaches exactly up into contact with the bottom surface of float section 16. As mail or any other weighable load matter is added on receptacle 23 the float structure will become immersed deeper and deeper in constant proportion to the increase in weight of such load up to the critical point of one full ounce of weight. Thus if all exterior surfaces of float section 16 are of bright red color in contrast, say, to a brilliant white color of all surfaces of float section 17 and a brilliant blue color of all surfaces of float section 18, the amount of red color of float section 16 that is conspicuously in the clear above the liquid level will gradually diminish as the load weight gradually increases from zero up to one full ounce. At this critical point represented in Fig. 3, only the top red surface of float section 16 is unsubmerged. Hence so long as any of the red color of float section 16 shows in the clear at or above the water level the user knows that the weight of the mail does not exceed one ounce and hence that the mail does not call for postage in excess of three cents, in the case of ordinary first class letter mail.

Figure 4:
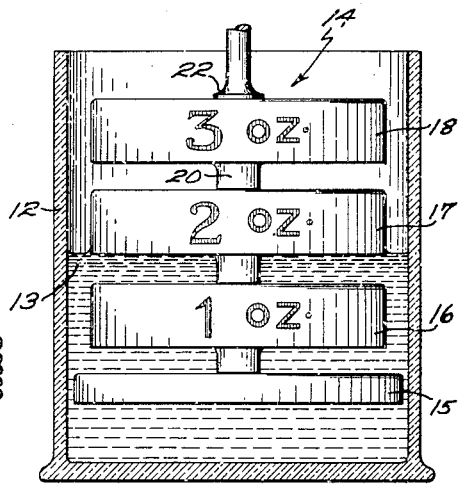
Fig. 4 is like Fig. 3 showing the float structure at a different depth to which it is immersed by any appreciable increase in load over a full one-ounce of weight.

However, when a full ounce of load weight is exceeded, even to a very slight extent by the mail on receptacle 23, the top surface of the red float section 16 is thereby caused to sink abruptly to a substantial depth below the top surface of the liquid preferably equalling as nearly as possible the vertical space between the top surface of red float section 16 and the bottom surface of white float section 17. Now the bottom surface of the white float section comes to rest on the top surface of the water as shown in Figs. 4 and 5. Thus all red color has become submerged and is either entirely concealed or at least is rendered relatively inconspicuous by the enveloping liquid 13 so that the absence of any showing of red becomes the conspicuous and unmistakable symbal that the weight of mail exceeds one ounce and that 3-cent postage is insufficient.

This manner of operation is repeated with respect to the blue float section 17 until the critical weight of exactly two whole ounces is reached. When this critical weight is exceeded even in the slightest an abrupt stepping down action of float structure 14 or 31 again takes place resulting in the new position of the float with respect to the liquid livel shown in Fig. 6.

Figure 3:
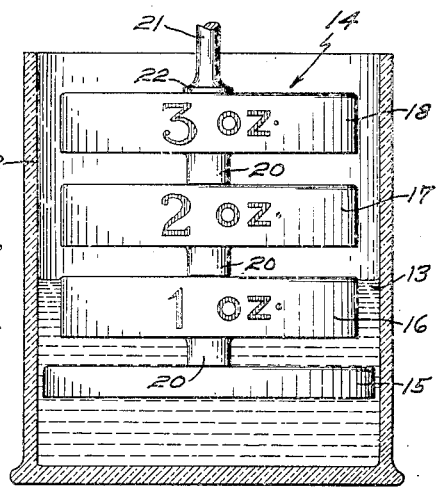
Fig. 3 is a fragmentary view similar to Fig. 2 showing the float structure at a depth to which it is immersed by a full one-ounce load on the mail receptacle.
Figure 2:
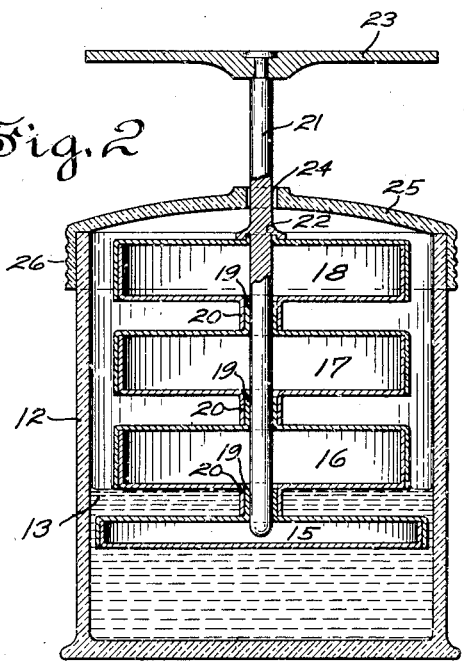
Fig. 2 is a view taken in central vertical section through the scale of Fig. 1 showing the mail receptacle unloaded.

For the better information of users not informed of the signal significance of the contrasting colors of the different float sections, a vertically extending series of weight informing indicia reading 1 oz., 2 oz., 3 oz., etc. may be marked on the peripheral edge of the float sections as shown in Figs. 1, 3 and 4.

In Figs. 5 to 8, inclusive, the vertical series of weight indicia shown in Figs. 1, 3 and 4 is supplemented by two additional series of weight indicia expressing units, not of weight, but of actual postage cost corresponding to the given different weights at varying rates of postages in the different categories of mail service such as registered mail or air mail. In order to help concentrate observation upon a single one of such multiple series of indicia at a time, the separate windows 33, 34 and 35 are provided in Figs. 5, 6 and 7 and each window is labeled with the appropriate legends shown in these figures informative of the category of mail service applying to the postage costs appearing in that particular window. The other windows will serve to admit additional light to the interior of the container if its walls aside from the window areas are opaque or translucent. Each vertical series of indicia is kept in visible register with its own particular window by the float turn preventive means 43 and 44.

It is to be noted that the lowest or non-indicating float section 15 is guided for free vertical movement by the interior surface of the side wall of the container whereas substantial radial space exists between float sections 16, 17, 18 and the container wall preventing any resistance by capillary attraction or skin tension of the liquid from impeding free vertical movement of the float structure 14 or 31. To further this end, there may also be considerable radial space between most of the periphery of float section 42 and the inside surface of container 32, the latter presenting three equally spaced internal ribs such as 43, for any or all of which there may be substituted outward directed ridges such as 47 carried by float section 42.

Many other modifications will be recognized as possible in a great variety of structures incorporating the principles of this invention. The float controlled stem 21 might connect by linkage to a more distant load receiver. The parts may be made large and sturdy for heavy duty step weighing action. These and all other obvious substitutes and equivalents for the particular constructions and arrangements herein disclosed are contemplated and intended to be covered by the following claims.

I claim:

1. A step action load weighing scale, including the combination with a depressible load receiver, of means automatically presenting step-by-step to said load receiver alternately small and large increments of increase in load counterbalancing force as said receiver is progressively depressed, said means including a liquid buoyed float of externally stepped contour operatively associated with said receiver.

2. A load weighing scale as defined in claim 1, in which the said float is contoured to form a series of vertically alternating relatively small and relatively large shouldered body portions.

3. A load weighing scale as defined in claim 1, in which the said load receiver is fixed to said float to move as a unit therewith.

4. A load weighing scale as defined in claim 1, in which the said float carries indicia informative of load weight values located thereon in a manner to register visibly and successively with the top surface of the liquid by which said float is buoyed as said float sinks progressively in said liquid responsively to increase of load weight on the said receiver.

5. A load weighing scale as defined in claim 1, in which the said float is externally contoured to form a series of vertically alternating relatively small and relatively large body portions, and float carried indicia informative of load measure located on said large body portions in a manner to register visibly and successively with the top surface of the body of liquid by which said float is buoyed.

6. A postal scale embodying a load receptacle for mail to be weighed, and liquid buoyed float means constructed and arranged yieldably to support said receptacle, said float means including a plurality of vertically ordered portions one of which portions is of relatively greater buoyancy and another of which portions is of relatively slighter buoyancy, the external side surfaces of each of said portions being vertical and being successively immersible in said liquid responsively to increase in load on said receptacle, said float portion of relatively slighter buoyancy intervening between said float portions of relatively greater buoyancy.

7. A postal scale as defined in claim 6, in which two of the said plurality of float portions are of equal buoyancy and spaced apart vertically.

8. A postal scale embodying a load receptacle for mail to be weighed, and liquid buoyed float means constructed and arranged yieldably to support said receptacle, said float means including adjoining float portions of differing buoyancy arranged one above another and successively immersible in said liquid responsively to increase in load on said receptacle at least some of the said float portions carrying a plurality of separate sets of weight value informative indicia, the indicia of each of said sets being arranged in vertical series, together with a partially nontransparent container for the said liquid provided with laterally separated limited transparent areas flanking said sets of indicia respectively and defining spaced windows through each of which the indicia of an individual set are rendered visible from the outside of said container, different legends marked on said container designating respectively different windows and informative of the category of the indicia visible through each of said windows, and means to maintain said sets of indicia in register with their respective said windows while permitting vertical movement of the said float means.

9. In a postal scale the combination of a container for liquid at least partially transparent having an open top, a cap removably supported on said container covering its said open top and containing a slide bearing aperture, a stem extending slidably through said aperture, a receptacle for a weighable load supported on said stem above said cap, and a float structure inside of said container fixed on said stem, said float structure including a series of vertically spaced float sections of relatively large compass and section spacing means of relatively small compass interposed between and connecting said float sections.

10. In a postal scale the combination of a container for liquid at least partially transparent having an open top, a cap removably supported on said container covering its said open top and containing a slide bearing aperture, a stem extending slidably through said aperture, a receptacle for a weighable load supported on said stem above said cap, and a float structure inside of said container fixed on said stem, said float structure including a series of separate float sections fixed to said stem in vertically spaced relation.

PORTER S. MORGAN.

REFERENCES CITED

The following references are of record in the file of this patent:

UNITED STATES PATENTS

| Number | Name | Date |
| --- | --- | --- |
| 171,670 | King | Jan. 4, 1876 |
| 264,432 | Atwater | Sept. 19, 1882 |
| 1,424,108 | Luthy | July 25, 1922 |
| 1,661,556 | Bryce | Mar. 6, 1928 |
| 2,054,260 | Leighton | Sept. 15, 1936 |